Feb. 13, 1962 K. C. FLINT ET AL 3,021,052

OPERATION SIGNALLING MECHANISM FOR CASH REGISTERS

Filed July 30, 1956 5 Sheets-Sheet 1

INVENTORS
KENNETH C. FLINT &
FRANK R. WERNER

BY Carl Beust

Richard Van Busum

THEIR ATTORNEYS

Feb. 13, 1962 K. C. FLINT ET AL 3,021,052

OPERATION SIGNALLING MECHANISM FOR CASH REGISTERS

Filed July 30, 1956 5 Sheets-Sheet 2

INVENTORS
KENNETH C. FLINT &
FRANK R. WERNER

BY Karl Benst
Richard Van Busum
THEIR ATTORNEYS

OPERATION SIGNALLING MECHANISM FOR CASH REGISTERS

Filed July 30, 1956 5 Sheets-Sheet 3

INVENTORS
KENNETH C. FLINT &
FRANK R. WERNER
BY Carl Beust
Richard Van Busum
THEIR ATTORNEYS Feb. 13, 1962 K. C. FLINT ET AL 3,021,052

OPERATION SIGNALLING MECHANISM FOR CASH REGISTERS

Filed July 30, 1956 5 Sheets-Sheet 4

INVENTORS
KENNETH C. FLINT &
FRANK R. WERNER

BY Carl Beust

Richard Van Busum

THEIR ATTORNEYS

INVENTORS
KENNETH C. FLINT &
FRANK R. WERNER
BY Louis A Kline
Richard Van Busum
THEIR ATTORNEYS

United States Patent Office 3,021,052

Patented Feb. 13, 1962

3,021,052

OPERATION SIGNALLING MECHANISM FOR CASH REGISTERS

Kenneth C. Flint, West Carrollton, and Frank R. Werner, Dayton, Ohio, assignors to The National Cash Register Company, Dayton, Ohio, a corporation of Maryland Filed July 30, 1956, Ser. No. 601,045
4 Claims. (Cl. 235—23)

This invention relates to cash registers and accounting machines and is particularly directed to improvements in totalizer signaling equipment for such machines.

The subject matter of this application is directed to means for visually indicating whether or not a particular totalizer has been selected for a clearing operation, and includes a small electric light located adjacent the indicator section of the machine where it is visible through a window provided in the cabinet or case which encloses the mechanism of the machine.

In this particular adaptation the signal light is used in conjunction with the main item totalizer and lights at the end of the operation in which said totalizer is selected for a clearing or item-total operation. Initiation of an operation of the machine operates a switch mechanism connected in the circuit of the light, which extinguishes said light during the time that the machine is operating. At the end of the machine operation the switch is again operated to cause said light to again become lighted to indicate the selection of said totalizer for a clearing operation. When the main item totalizer is not selected for a clearing operation, the signal light will remain out at all times.

The machine as at present constructed has a first and a second row of transaction control keys, each of which rows has a differential mechanism positionable under control of the corresponding control keys.

The switch mechanism for the signal light in addition to being controlled by the mechanism which initiates operation of the machine is likewise controlled by the differential mechanism for the keys of the first transaction row, whereby the keys of this row which select the main item totalizer for a clearing operation cause the switch for the signal light to close to light the light to indicate the selection of said main item totalizer for a clearing operation. If necessary or required it is a relatively simple matter to arrange the mechanism of the machine so that the differential mechanism for the second row of transaction keys will control the operation of the switch for the signal light so that the selection of certain totalizers corresponding to said second transaction control keys for clearing operations will cause the switch mechanism to become effective to control the operation of the signal light to indicate the selection of said totalizers for a clearing operation. A main switch is provided for controlling the effectivness of the signal light.

With the above brief outline in mind it is therefore a general object of this invention to provide means to visually indicate the type of operation being performed in a particular totalizer.

Another object is the provision of a signal light and operating and controlling means therefor which causes said light to light and remain lighted when the machine is at rest and a clearing operation has been performed in a particular totalizer.

With these and incidental objects in view, the invention includes certain novel features of construction and combinations of parts, a preferred form or embodiment of which is hereinafter described with reference to the drawings which accompany and form a part of this specification.

KEYBOARD AND TOTALIZERS IN GENERAL

Figure 2:
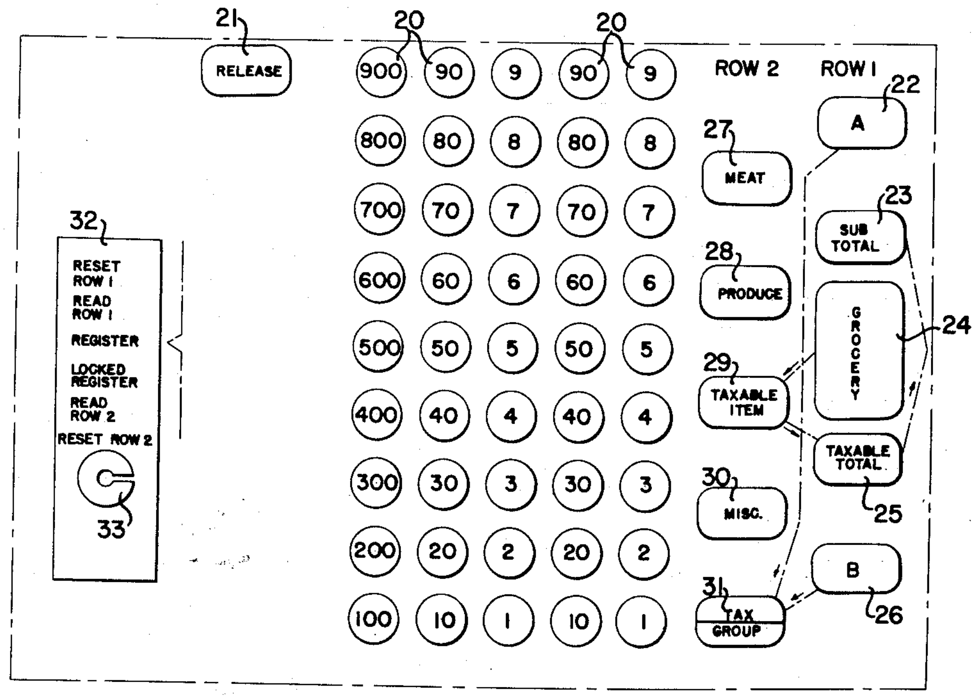
FIG. 2 is a diagrammatic plan view of the keyboard of the machine chosen to illustrate the present invention.

Referring to FIG. 2, which is a diagrammatic plan view of a typical keyboard arrangement for the machine chosen to illustrate the present invention, said keyboard comprises five rows of amount keys 20 of so-called "flexible construction" in that the depression of an amount key in a particular denominational row releases a previously depressed key in said row and so on. A release key 21 is provided for releasing any depressed amount keys 20 prior to initiation of machine operation.

The present machine is provided with two lines of totalizers, a No. 1 or lower totalizer line, the selection of the different totalizers thereon being controlled by a Row 1 of control keys 22 to 26 inclusive, located at the right-hand edge of the keyboard, and a No. 2 or upper totalizer line, the selection of the totalizers therein being controlled by a Row 2 of control keys 27 to 31 inclusive located immediately to the left of the No. 1 control keys.

The present machine is provided with the usual unit lock lever or total control slide 32 located on the left-hand side of the keyboard (FIG. 2) for controlling the various functions of the machine. The normal position of the total control slide 32 is in Register position as here shown and when thus positioned it conditions the machine for normal operation under the control of the No. 1 and No. 2 control keys 22 to 31 inclusive. Moving the total control slide 32 to Locked Register position locks the machine against operation under any circumstances. The total control slide 32 likewise may be positioned to select and condition the No. 1 and No. 2 totalizer lines for either read or reset operations, often referred to as sub-total and total operations, and when so positioned is used in conjunction with the No. 1 and No. 2 control keys 22 to 31 for selecting and conditioning the corresponding totalizers for reading and resetting operations. The total control slide 32 incorporates a lock 33, which is provided with two keys (not shown) one of which permits said slide to be locked in either Register or Locked Register position so that said slide may not be moved out of these positions by unauthorized persons. The total control slide 32 is normally locked against movement into either Reset Row 1 or Reset Row 2 position, and a special reset key is provided for controlling the lock 33 so that said slide may be moved to either of these reset positions.

As previously explained, the present machine has a No. 1 or lower totalizer line 19 (FIG. 7) and a No. 2 or upper totalizer line 34 (FIG. 6) and as both lines are similar in construction it is believed that a general description of the No. 2 line will suffice for the purpose of the present application. However, if a more detailed description of the totalizers is required, reference may be had to Application for Letters Patent of the United States, Serial Number 412,464, filed February 25, 1954, by Frank R. Werner and Kenneth C. Flint, inventors, and to United States Patent No. 2,880,930, issued April 7, 1959, to Frank R. Werner, Kenneth C. Flint, and Walter G. Sterzer, inventors.

The No. 1 totalizer line 19 (FIG. 7) has four sets of totalizer wheels 18 thereon, one set of which corresponds to the A control key 22, another set to the B control key 26, and there is a main item totalizer for the accumulation of non-taxable items and an auxiliary item totalizer for the accumulation of taxable items.

The No. 2 or upper totalizer line 34 (FIG. 6) has five sets of totalizer wheels 35 thereon, corresponding respectively to the five No. 2 control keys 27 to 31 inclusive. The five sets of totalizer wheels 35 are shiftable under the control of the corresponding No. 2 control keys 27 to 31 to align the sets of wheels corresponding to the effective control key with the amount actuators for actuation thereby. The five sets of totalizer wheels 35 are rotatably mounted on a sleeve (not shown) shiftably supported on the shaft 34, said shaft in turn being supported in a No. 2 totalizer framework (not shown) which is shiftably mounted between the right and left main frames for the purpose of engaging and disengaging the selected totalizer wheels and the amount actuators.

Mounted to slide on the shaft 34 (FIG. 6) in unison with the sleeve which supports the wheels 35, is a shifting collar 36 having an annular groove engaged by the tines of a shifting fork 37 free on a shifting rod 38 supported by the main frames of the machine, said shifting fork being confined between collars secured to said rod 38 so that it will shift laterally in unison therewith. Secured on the right-hand end of the rod 38 is a shifting block 39 having a slot which slidably engages a fixed stud 40 to hold said block and said rod 38 against rotational movement. The block 39 carries a screw stud 41 which engages a helical shifting groove in a shifting cam 42, rotatably mounted on a fixed stud 43. Secured to the left face of the shifting cam 42 is a pinion 44 engaged by teeth in a shifting sector 45 free on a shaft 46 supported by the main frames of the machine, said shaft in turn supporting the differential mechanisms for the different denominational orders of amount key banks. The sector 45 (FIG. 6) has a notch engaged by the rounded inner end of a lever 56 free on a fixed stud 47. The outer end of the lever 56 has a slot which engages a stud 48 in a curved shifting plate 49 rockably supported between companion links 50 and 51, which are in turn pivoted on fixed studs 52 and 53 secured in the frame work for the No. 2 control key bank.

The plate 49 has five camming notches 54 formed in the outer periphery thereof arranged to coact with corresponding studs 55, secured in the stems of the keys 27 to 31 inclusive (FIG. 2). Only one of the keys 27 to 31 may be depressed at a time and depression of any one of said keys causes its corresponding stud 55, in cooperation with the corresponding camming notch 54, to rock the plate 49 an extent corresponding to the depressed key. The movement of the plate 49 is transmitted by the lever 56 to the sector 45, causing said sector to rotate the pinion 44 and the cam 42, whereupon the cam groove in said cam, in cooperation with the stud 41, shifts the rod 38, fork 37, collar 36, and the sleeve which supports the No. 2 totalizer wheels 35 to aline the set of totalizer wheels 35 corresponding to the depressed control key with the differential mechanism for actuation thereby.

From the foregoing description it should be clear that the manual act of depressing the control keys 27 to 31 alines the corresponding set of totalizer wheels 35 on the No. 2 totalizer line with the differential mechanism for actuation thereby.

Means is provided to retain the sector 45 (FIG. 6) and connected mechanism in set position during machine operation, and this mechanism comprises an aliner 58 arranged to engage teeth in the downward portion of said sector 45. The aliner 58 is free on a fixed stud 59 and has integral therewith a downwardly extending arm 60, said arm and said aliner being urged clockwise by a spring 61 to normally maintain a surface on the forward edge of said arm in yielding contact with a stud 62 extending between a disengaging link 63 for the No. 1 totalizer line and a similar disengaging link 64 for the No. 2 totalizer line. The links 63 and 64 operate back and forth in unison to disengage their corresponding totalizers in the manner explained in the application Serial No. 412,464, referred to before, and in so operating they in turn actuate the aliner 58 to retain the selected set of totalizer wheels 35 in alinement with their differential mechanisms for proper engagement with and disengagement from said mechanisms.

The rockable framework which supports the No. 2 totalizer line 34 is pivotally connected by a link 66 (FIG. 4) to a bell crank 67 free on a stationary stud 68. A downward arm of the bell crank 67 carries a stud 69 which pivotally supports the rearward end of an add engaging pitman 70, having an enlarged forward end with an opening having a forward control surface which coacts with a flattened stud 71 secured in a downward extension of a lever 72 free on a shaft 73 supported by the machine framework. A spring 74 urges the lever 72 counterclockwise to normally maintain a roller 75 carried thereby in yielding engagement with the periphery of an add engaging cam 76 secured on a main cam shaft 77, journaled in the machine framework and making one clockwise revolution each machine operation (FIG. 4) for effecting a cycle of operation of the machine mechanism. A reset pitman 78 (FIGS. 4 and 5) similar in outline to the add pitman 70 is pivotally supported at its rearward end on the stud 69 and is secured in proper spaced relationship to said pitman 70 by studs 79 and 80 extending between said pitmans. The enlarged forward end of the pitman 78 (FIG. 5) has an irregularly shaped opening having formed therein a forward control surface which coacts with a flattened stud 81 secured in a downward extension of a lever 82 free on the shaft 73. A spring 83 urges the lever 82 counterclockwise to normally maintain a roller 84 carried thereby in yielding contact with the periphery of a reset engaging cam 85 secured on the main cam shaft 77.

The stud 80 (FIGS. 4 and 5) is pivotally engaged by the lower end of an engaging link 88, the upper end of which has a slot 89 engaging a stud 90 in a rearward extension or arm 91 of a segment 92 free on the shaft 46. The link 88 carries a roller 93 which engages a slot in the rearward end of an arm 94 free on a fixed stud 95 and integral with a companion crank 96, having a stud 97 which extends into and coacts with a cam slot 98 in a control segment 99 free on the shaft 46. The segment 99 is operatively connected to the total control slide 32 (FIG. 2) by means of a slot in the upper end thereof which engages a stud 100 in the downward end of an arm 101 secured on a shaft 102 journaled in the machine framework and connected by mechanism (not shown) to the total control slide 32 for operation thereby. A spring 103 (FIGS. 4 and 5) urges the pitmans 70 and 78 and the link 88 downwardly to normally maintain the stud 97 in yielding engagement with the outer surface of the cam slot 98.

Figures 4, 5:
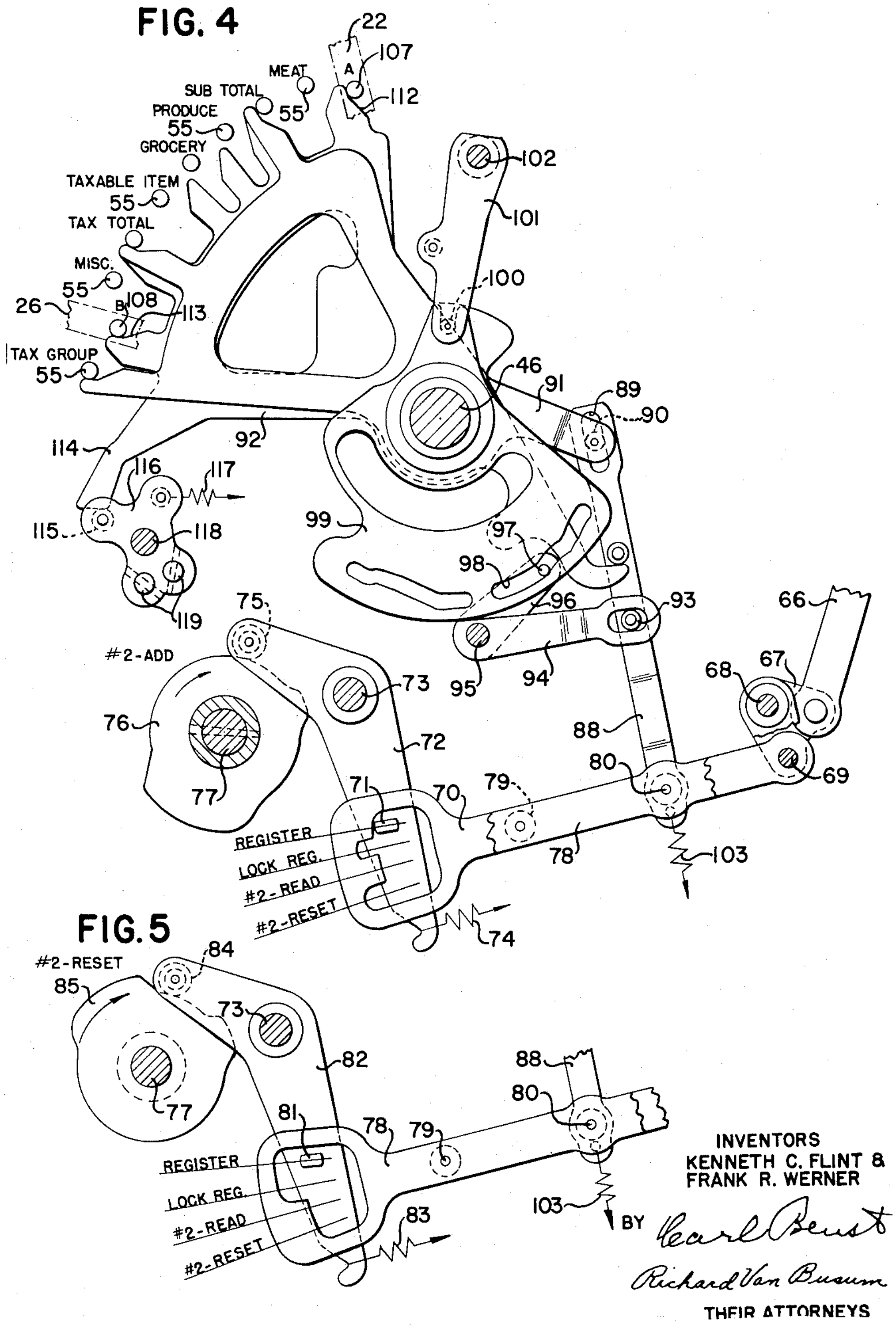
FIG. 4 is a right side elevation of a portion of the mechanism for controlling the selection of and adding function of the totalizers on the No. 2 totalizer line.
FIG. 5 is a detail view of the mechanism for controlling the read and reset functions of the totalizers on the No. 2 totalizer line.

When the total control slide 32 is in Register position, as shown in FIG. 2, the segment 99 will be positioned as shown in FIG. 4, whereupon the slot 98 in cooperation with the stud 97, crank 96, arm 94 and link 88 will position the pitmans 70 and 78 in their extreme downward or counterclockwise position, in which the forward control surfaces of the openings in said pitmans will be positioned as shown in FIGS. 4 and 5 to coact with the studs 71 and 81 in the levers 72 and 82. This will cause the selected totalizer on the No. 2 totalizer line to be engaged with the amount actuators in add timing.

Moving the total control slide 32 upwardly one step from Register to Locked Register position will advance the segment 99 one step in a clockwise direction, causing the slot 98 in cooperation with the stud 97 to rock the crank 96 and arm 94 a slight distance counterclockwise. Counterclockwise movement of the arm 94 lifts the link 88, which in turn lifts the pitmans 70 and 78 one step in a clockwise or upward direction to Locked Register position in which no engaging movement is imparted to the No. 2 totalizer line.

Moving the total control slide 32 (FIG. 2) upwardly two steps to Read Row 2 position, through the mechanism shown in FIG. 4, lifts the pitmans 70 and 78 two steps upwardly, whereupon the forward control surfaces in the openings in said pitmans, coacting with the corresponding studs 71 and 81, cause the No. 2 totalizer line to receive engaging movement to engage the selected set of totalizer wheels with the amount actuators in read timing.

Moving the total control slide 32 upwardly three steps to Reset Row 2 position causes the pitmans 70 and 78 to be lifted upwardly three steps or full distance, whereby the control surfaces in the openings in said pitmans, in cooperation with the corresponding studs 71 and 81, cause the selected set of wheels on the No. 2 totalizer line to be engaged with the amount actuators in reset timing to cause said selected wheels to be reset or zeroized. Moving the total control slide 32 (FIG. 2) downwardly to either Read Row 1 or Reset Row 1 position causes a concentric portion of the cam slot 98 in the segment 99 to coact with the stud 97. Consequently no movement is imparted to the crank 96, arm 94, link 88, and pitmans 70 and 78, and as a result, these parts remain in Register position, as here shown, to cause the selected No. 2 totalizer to be engaged with the amount actuators in add timing.

As previously explained, in the present adaptation the No. 2 totalizer line has five sets of totalizer wheels thereon corresponding to the keys 27 to 31 inclusive, which are selected by said keys in a manner explained in connection with FIG. 6. However, the Tax Group key 31 is a dual purpose key and when the total control slide 32 is in Register position, said key 31 functions as a printing key only for printing certain tax items upon the record material. When the total control slide 32 is in Read Row 2 position, the key 31 then functions as a selecting key to select the corresponding totalizer on the No. 2 line for engagement with the amount actuators for reading. As will be explained later, the key 31 is blocked against operation when the total control slide 32 is in Reset Row 2 position.

As explained in a general way previously, the No. 1 or lower totalizer line 19 (FIG. 7) has four sets of totalizer wheels 18 thereon, comprising a main itemizer, an auxiliary itemizer, a group or storage totalizer corresponding to the A key 22, and a similar group or storage totalizer corresponding to the B key 26. The Sub-Total key 23 causes the main itemizer to be read or sub-totalized, and the Taxable Total key 25 causes the auxiliary itemizer to be cleared and the amount therein transferred to the main itemizer, as is usual practice with this type of machine.

The control keys 27, 28 and 30, in control or transaction Row 2 (FIG. 2) in addition to selecting their corresponding totalizers on the No. 2 totalizer line, simultaneously select the main itemizer for the accumulation of the items corresponding to these keys. Likewise, the Grocery key 24 in transaction Row 1 also selects the main itemizer to accumulate the total amount of groceries purchased and simultaneously selects a corresponding totalizer on the No. 2 totalizer line for the accumulation of a group total of all grocery items, including taxable and non-taxable items.

The Taxable Item key 29 in Row 2, in addition to selecting the corresponding totalizer on the No. 2 line, simultaneously selects the auxiliary or taxable item totalizer on the No. 1 totalizer line to accumulate an item total of the taxable items. After all of the taxable items have been entered, the Taxable Total key 25 in Row 1 is used to initiate a taxable total operation during which the auxiliary totalizer is cleared and the amount of the taxable items accumulated therein is simultaneously transferred to the main itemizer which now contains all of the items including taxable and non-taxable items.

Normally machines of this type are capable of performing either single item or multiple-item transactions. In a single item transaction the amount of the single item is set up on the amount keys and the Single Item key in Row No. 1 is depressed to initiate machine operation in which the amount of the item is indicated, recorded and entered into the storage totalizer. A multiple item transaction comprises several item entering operations and a final item total operation. In each of the item entering operations the price of an item is set up on the amount keys and the proper item key is depressed to initiate machine operation in which the item is entered in the item totalizer, the corresponding group totalizer and simultaneously indicated and recorded.

In the present machine the A and B keys 22 and 26 take the place of the item total key and may be used as clerks or department keys or any other suitable use. It is compulsory that one of these keys be used to complete an item transaction to obtain separate group totals corresponding to each key and in effect all transactions in the present machine are equivalent to multiple item transactions, regardless of whether the entering of one or more items is involved.

In functioning as item total keys the A and B keys cause the main item totalizer to be cleared and the amount therein transferred to the corresponding A or B group totalizer on the No. 1 line and to a common storage totalizer on the No. 2 line, the latter to obtain a combined total of the amounts in the A and B group totalizers.

Figure 6:
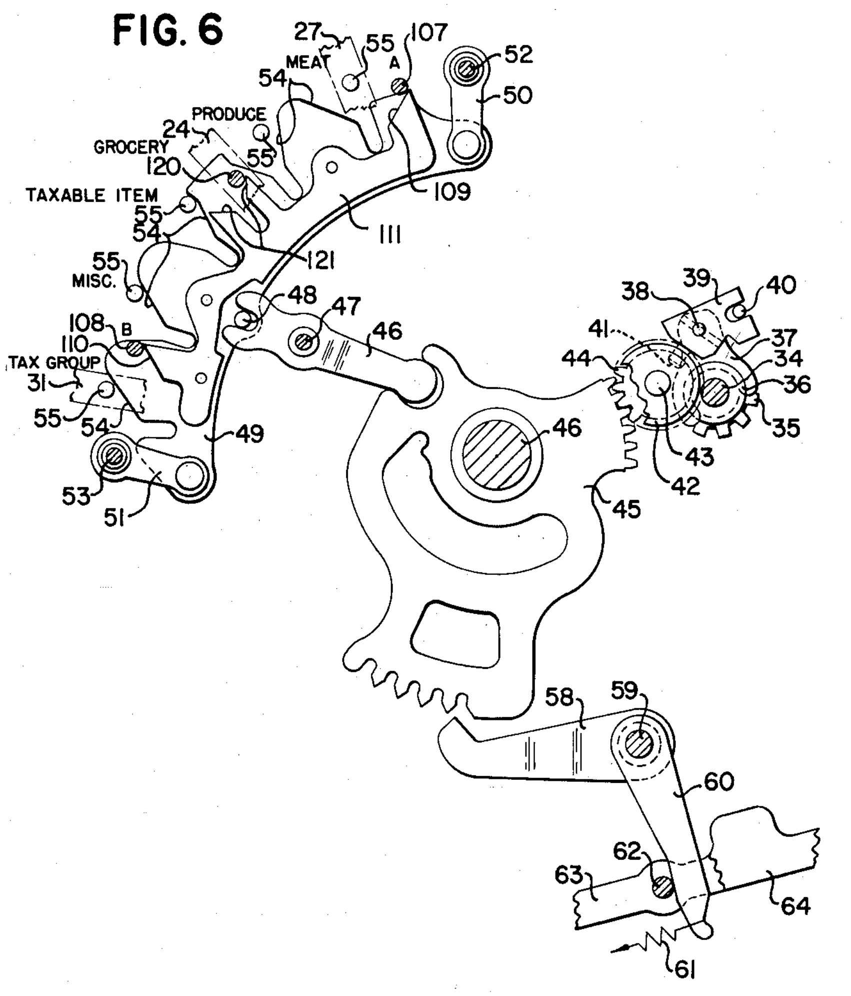
FIG. 6 is a right side elevation of a portion of the mechanism for controlling the selection of the different totalizers on the No. 2 totalizer line through the medium of the No. 1 control keys and the No. 2 control keys.
Figure 7:
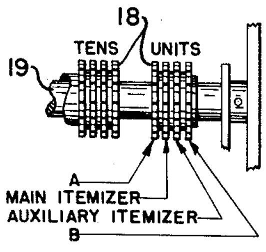
FIG. 7 is a detail view of a fragment of the No. 1 totalizer line.

The Row 1 control keys 22 to 26 inclusive (FIG. 2) through a totalizer selecting mechanism similar to that disclosed in FIG. 6 for the Row 2 control keys, selectively shift the No. 1 totalizer wheels 18 (FIG. 7) to aline the set of wheels corresponding to the depressed control keys 22 to 26 with the amount actuators, for actuation thereby. Likewise, mechanism similar to that disclosed in FIGS. 4 and 5, for controlling the engaging and disengaging movements of the selected set of totalizer wheels 35 on the No. 2 totalizer line, and the amount actuators, is provided for the Row 1 control keys 22 to 26, for controlling the timing of the engaging and disengaging movement of the selected set of totalizer wheels 18 on the No. 1 totalizer line, and the amount actuators, in accordance with the type of operation being performed.

The totalizer selecting and engaging and disengaging mechanisms for the Row 1 control keys are fully disclosed in FIGS. 22, 23, 30, and 31, and the description in connection therewith, in the co-pending application, Serial No. 341,633, now United States Patent No. 2,880,930, to which reference may be had if a more detailed description of these mechanisms are required.

The A and B keys 22 and 26 (FIGS. 2 and 6) carry respectively studs 107 and 108 which coact with corresponding camming surfaces 109 and 110 on upward projections formed on an auxiliary plate 111 secured to the right-hand face of the No. 2 totalizer shifting plate 49. Depressing either the A or B key 22 or 26, through the surface 109 or 110, shifts the plates 111 and 49 the same extent to select the totalizer on the No. 2 line corresponding to the key 31 to receive the amount cleared from the main itemizer. It should therefore be evident that the A and B keys 22 and 26 function to cause totals to be transferred from the main itemizer to corresponding group totalizers on the No. 1 totalizer line and to a common storage totalizer on the No. 2 totalizer line in one operation of the machine.

Depressing either A or B key 22 or 26 causes the corresponding stud 107 or 108 therein (FIG. 4), in cooperation with corresponding camming surfaces 112 and 113 on projections of the segment 92, to rock said segment counterclockwise. This causes a downwardly extending leg 114 of said segment, in cooperation with a stud 115 in an arm 116 free on a shaft 118 journaled in the machine framework, to rock said arm counterclockwise against the action of a spring 117. The arm 116 is connected by two rods 119 to a series of blocking arms (not shown) also free on the shaft 118, one of said blocking arms being provided for coacting with the control detent for each amount bank. Counterclockwise movement of the arm 116 and the blocking arms, causes said blocking arms to move beneath downward extensions of the corresponding control detents to obstruct depression of the amount keys when either of the keys 22 or 26 is depressed.

The Grocery key 24 (FIGS. 2 and 6) carries a stud which coacts with camming surfaces 121, formed on the mutilated periphery of the auxiliary plate 111, to shift said plate and the main plate 49, the proper extent to select the totalizer on the No. 2 line corresponding to the Taxable Item key 29, to accumulate a grand total of all items accumulated in the main itemizer, including both taxable and non-taxable items.

If a more detailed disclosure of the mechanism described briefly above is desired, including particularly the transfer total mechanism, reference may be had to the co-pending applications, Serial Numbers 341,633 and 412,464, the former now United States Patent No. 2,880,930, which contain a complete disclosure of said mechanism.

It should be noted that counterclockwise movement of the segment 92 (FIG. 4), upon depression of either of the keys 22 or 26, as explained above, causes the stud 90 to ride idly in the upper portion of the slot 89 and therefore does not impart any lifting movement to the link 88 and pitmans 70 and 78 and as a result said pitmans remain in the position shown here to cause the selected totalizer on the No. 2 line to be engaged in add timing to accumulate a grand total of the amounts cleared from the main itemizer by use of said keys 22 and 26.

The total control lever or slide 32 (FIG. 2) controls the depression of the No. 2 control keys 27 to 31 in accordance with the position of said slide through the medium of a control segment 122 (FIG. 3), free on the shaft 46 and having a slot which engages a stud 123 in an arm 124 secured on the shaft 102, which, as previously explained, is operatively connected to said total control slide 32 and is operated thereby, when said slide is moved to its various positions. The mutilated control periphery of the segment 122 coacts with the studs 55 in the keys 27 to 31 to control the depression of said keys in accordance with the position of the total control slide 32. There are clearance portions in the control periphery of the segment 122 which, in cooperation with the studs 55, permit all of the keys 27 to 31 to be depressed when the total control slide 32 is in Register position, as here shown. Moving the total control slide to Locked Register position moves obstructing surfaces on the periphery of the segment 122 opposite all of the studs 55 to prevent depression of the keys 27 to 31 inclusive, when said total control slide is in Locked Register position.

Figure 3:
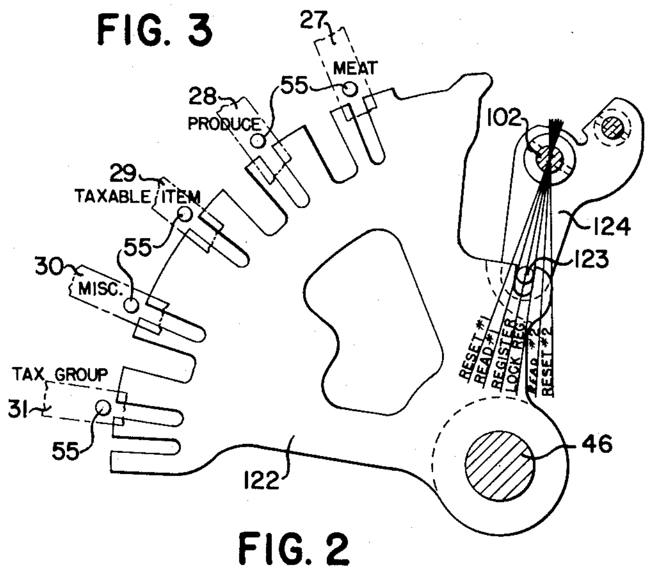
FIG. 3 is a detail view of the locking plate and associated mechanism for controlling the operation of the control keys for the No. 2 or upper totalizer line.

Moving the total control slide 32 to Read Row 2 or Reset Row 2 position moves clearance portions of the periphery of the segment 122 opposite the studs 55 in the keys 27, 28 and 30, to permit these keys to be depressed to read or reset the corresponding totalizers on the No. 2 totalizer line under these conditions. Moving the total control slide 32 to Read Row No. 2 position moves a clearance portion of the periphery in the segment 122 opposite the stud 55 in the Tax Group key 31 to permit depression of said key to read the combined amounts entered in the corresponding totalizer on the No. 2 line under the control of the A and B keys 22 and 26. It will be noted in the present arrangement that when the total control slide 32 (FIGS. 2 and 3) is moved to Reset Row No. 2 position, a high portion of the periphery of the segment 122 obstructs the stud 55 in the key 31 thus preventing depression of said key, to obtain what is often termed a "running grand or group total" of the amounts transferred to the corresponding totalizer under the control of the keys 22 and 26. When the total control slide 32 is moved either to Read Row 2 or Reset Row 2 position, a high portion of the periphery of the segment 122 obstructs the stud 55 in the Taxable Item key 29 to prevent depression of this key, except when said total control slide is in Register position, as shown in FIGS. 2 and 3. Moving the total control slide 32 to Read Row 1 or Reset Row 1 position locates high portions of the periphery of the segment 122 opposite the studs 55 in the keys 27 to 31 inclusive to prevent depression of said keys under these conditions. A segment (not shown) similar to the segment 122 (FIG. 3) is provided for the Row 1 keys 22 to 26 inclusive to control depression of said keys in accordance with the position of the total control slide 32.

*Clear signal mechanism*

Figure 1:
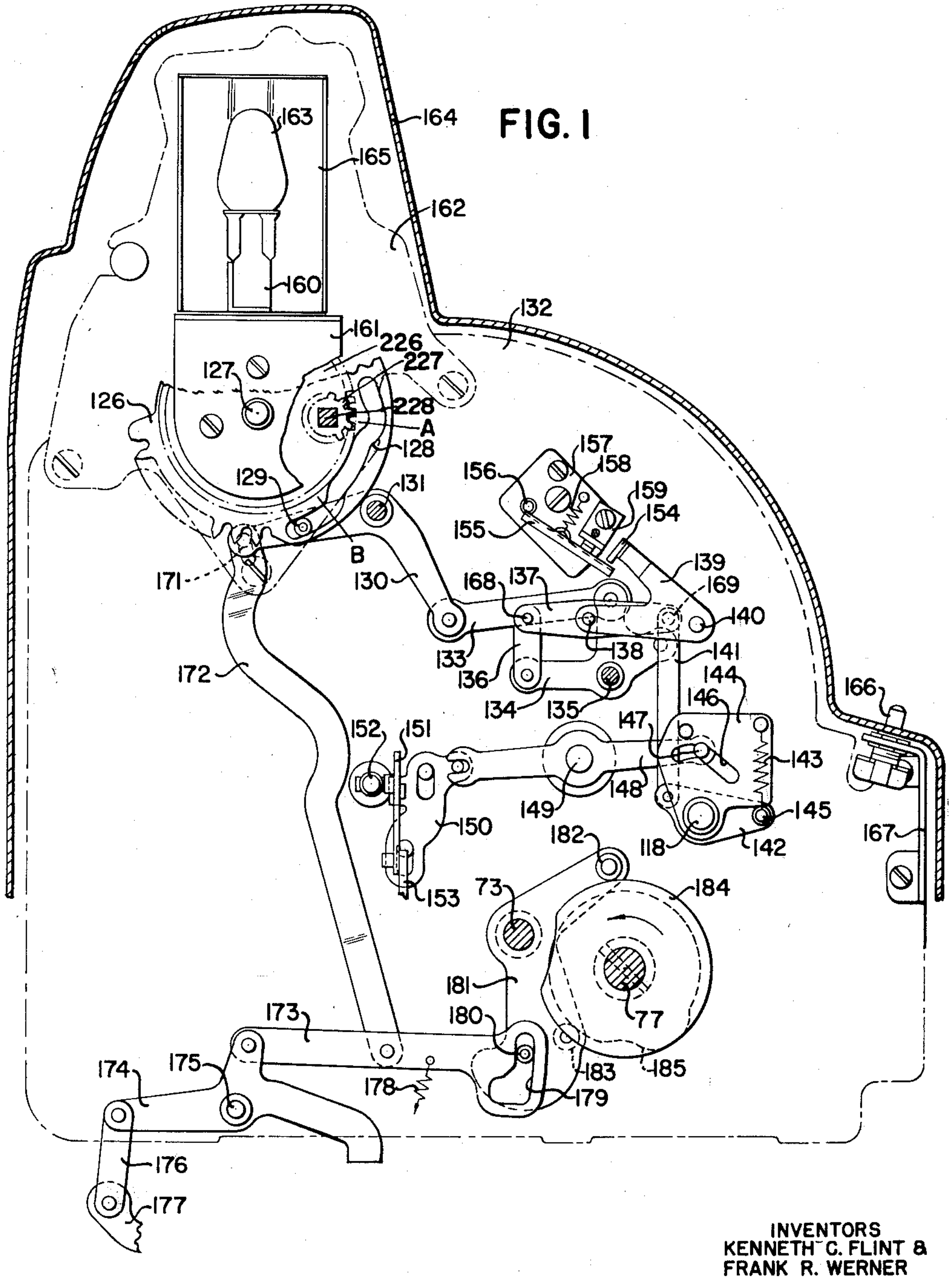
FIG. 1 is a left side elevation of the machine showing in particular the clear signal light and the operating and controlling mechanism therefor.

Inasmuch as it is compulsory that the A and B keys 22 and 26 (FIG. 2) be used in the final clearing or item total operation of each item transaction, mechanism controlled by these keys is provided for visually indicating whether or not the main item totalizer on the No. 1 line has been selected for a clearing operation. This mechanism, often referred to as a "clear signal mechanism," is illustrated in FIG. 1 and will now be described.

The Row 1 transaction keys 22 to 26 inclusive (FIG. 2) have associated therewith a differential mechanism similar to that shown in FIG. 12 of the application, Serial No. 341,633, now United States Patent No. 2,880,930. Each of the keys 22 to 26 inclusive (FIG. 8) is provided with a compressible spring 189, which encircles the lower end of the stem of said keys and coacts between a shoulder formed on said keys and a shoulder formed in the framework for said keys to continuously urge said keys outwardly to undepressed position, as here shown.

The studs 107 and 108 in the A and B keys 22 and 26 coact with corresponding curved slots 190 in a machine release plate 191 swung on the inner ends of similar links 192 pivoted at their outer ends on studs secured in the framework of said keys 22 and 26. A downward extension of the plate 191 carries a stud 193, which engages a slot in a machine release or trip pawl 194 free on a shaft 195 journaled in the machine framework. Free on the shaft 195, and mounted adjacent the pawl 194, is a non-repeat pawl 196, carrying a stud 198, which is normally maintained in yielding engagement with a shoulder formed on the upper edge of said pawl 194 by a spring 197, tensioned between said pawls 194 and 196, so as to urge said pawls towards each other.

Depressing either the A clerk's key 22 or the B clerk's key 26 causes the stud 107 or 108, in cooperation with the corresponding curved slot 190 in the plate 191, to rock said plate downwardly, or clockwise, against the action of a spring 201. Downward movement of the plate 191, through the stud 193, rocks the release pawl 194 downwardly, or counter-clockwise, in unison therewith to move a forward nose, formed on said pawl, beneath and out of the path of a stud 199 fast in the upper end of a crank 200, secured on the machine release and key lock shaft 118. This frees the release shaft 118 to spring action, which immediately rocks said shaft clockwise, as viewed in FIGS. 8 and 9, and counter-clockwise, as viewed in FIG. 1, to initiate operation of the machine. The non-repeat pawl 196 follows the trip pawl 194 until the lower surface thereon contacts the stud 199, whereupon said release pawl 194 continues its counter-clockwise releasing movement independently of said non-repeat pawl 196, to free the shaft 118 for releasing movement, as explained above. During its releasing movement, the stud 199 moves over a curved upper surface of the trip pawl 194 to retain said pawl in its downward, or tripped, position during operation of the machine.

Near the end of machine operation, the shaft 118, the arm 200, and the stud 199 are restored counter-clockwise (FIG. 8) in a manner to be described presently, to move said stud 199 beyond the outer end of the trip pawl 194 and also beyond the outer end of the non-repeat pawl 196. At the same time, the depressed clerk's key 22 or 26 is released to the action of its spring 189, which urges said key upwardly, causing the corresponding stud 107 or 108, in cooperation with its corresponding curved slot 190, to assist the spring 201 in restoring the plate 191 upwardly, or counter-clockwise, which immediately restores the pawls 194 and 196 upwardly to move the outer end of said pawl 194 into the path of the stud 199, so that, when the release shaft 118 is returned to normal position, the stud 199 will contact the outer end of said pawl, as shown here, to terminate operation of the machine.

In case the depressed clerk's key 22 or 26 is inadvertently retained in depressed condition at the end of machine operation, the springs 189 and 201 will be unable to restore the plate 191 upwardly, and consequently the trip pawl 194 will remain beneath the stud 199. However, in this case, the non-repeat pawl 196, which is under increased tension of the spring 197 at this time, will drop down in the path of the stud 199, when it and the shaft 118 are restored full distance counter-clockwise (FIG. 8), to obstruct clockwise releasing movement of said shaft 118 and thus prevent an unwanted repeat operation of the machine. The subsequent release of pressure on the depressed key 22 or 26 permits the spring 189 to restore said key upwardly, causing the stud 107 or 108 therein, in cooperation with the curved slot 190, to assist the spring 201 in restoring the plate 191 and the pawls 194 and 196 upwardly, to disengage said pawl 196 from the stud 199 and to move said pawl 194 into the path of said stud 199 to retain said shaft 118 in its untripped, or home, position.

The row 1 control keys 23, 24, and 25 (FIGS. 2 and 8) have studs, similar to the studs 107 and 108 in the keys 22 and 26, which coact with corresponding slots 190 to operate the plate 191 to initiate machine operation in exactly the same manner as explained above in connection with said keys 22 and 26.

The mechanism for operating the release and key lock shaft 118 is disclosed in FIG. 9 and will now be described.

Secured near the center of the machine release and key lock shaft 118 is a hook-shaped arm 203 carrying a stud 204 engaged by a slot in the upper arm of a bell crank 205 free on the shaft 73. A spring 206, tensioned between the downward arm of the bell crank 205 and a bracket 207, secured to the upper surface of a machine base 208, which assists in supporting the machine framework, causes said bell crank to urge the arm 203 and the shaft 118 clockwise (FIG. 9) to normally maintain the stud 199 in yielding engagement with the outer end of the trip pawl 194, to locate said shaft 118 in home, or untripped, position.

Depressing any one of the keys 22 to 26 (FIGS. 8 and 9) disengages the trip pawl 194 from the stud 199 to free the shaft 118 to the action of the spring 206, which immediately rocks said shaft clockwise to initiate operation of the machine. Clockwise movement of the shaft 118 and connected parts is terminated by a bent-over ear 209 on the downward arm of the bell crank 205 coming into contact with a rubber bumper 210 bonded to the outer face of the bracket 207. Clockwise movement of the shaft 118, as viewed in FIGS. 8 and 9, and counter-clockwise movement of said shaft, as viewed in FIG. 1, causes the clutch mechanism (not shown) which connects the operating motor (not shown) to the main drive shaft 77 to be engaged and simultaneously closes a switch (not shown) to complete an electrical operating circuit to said motor, whereupon said motor rotates said main cam shaft clockwise, as viewed in FIGS. 8 and 9, and counter-clockwise, as viewed in FIG. 1.

Figure 8:
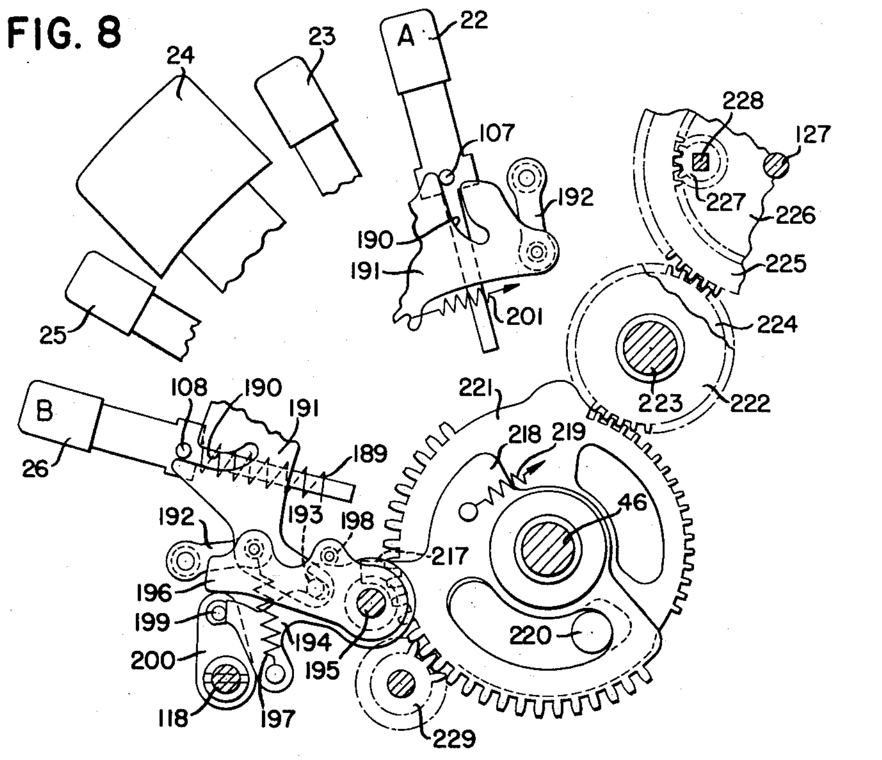
FIG. 8 is a right side elevation of row 1 control keys and the differential mechanism associated therewith.

The main cam shaft 77 makes one complete revolution for each machine operation, and, near the end of this revolution, a roller 211, mounted on a disc 212, secured on said shaft 77, engages a cam nose 212, formed on the outer end of an arm 213, integral with the bell crank 205, and rocks said arm and said bell crank clockwise against the action of the spring 206, to restore the arm 203 and the shaft 118 counter-clockwise full distance, as explained above, so that the stud 199 will move beyond the ends of the pawls 194 and 196 (FIG. 8). This disengages the clutch mechanism between the operating motor and the main cam shaft 77 and a simultaneously opens the switch for said motor to terminate machine operation. Concurrently with termination of machine operation, the roller 211 moves off of the nose 212 to permit the spring 206 to return the shaft 118 and the stud 199 (FIG. 8) clockwise until said stud comes into contact with the outer end of the trip pawl 194 to arrest and locate said shaft 118 in home, or untripped, position, as shown here.

The shafts 73 and 77 (FIG. 9), which are journaled in the main framework of the machine, receive additional support near their centers by an upright 214, extending upwardly from the machine base. Similarly, the shafts 118 and 195 receive additional support near their centers by a plate 215, secured to said upright 214.

In machines in which the row 2 keys 27 to 31 inclusive (FIG. 2) are arranged to initiate machine operation, they also coact with the plate 191 in exactly the same manner as explained for the keys 22 to 26, to trip the shaft 118.

*Row 1 differential mechanism*

The transaction keys 22 to 26 inclusive (FIG. 8) are provided with a differential mechanism which is connected to and positions corresponding type wheels and indicators in accordance with the depressed transaction key, for the purpose of recording and indicating data for use in identifying the type of transaction being performed.

Depressing any one of the keys 22 to 26 moves the lower end of its stem into the path of a projection 217 on a transaction primary differential member 218 free on the shaft 46 and urged clockwise by a spring 219 to normally maintain the rear, or right-hand, end of a concentric slot therein in yielding contact with a leading rod 220 mounted on the shaft 46 for oscillating movement first clockwise and then back to normal position, in which position it is shown here. Associated with primary differential member 218 is a corresponding secondary differential member 221, also free on the shaft 46 and having gear teeth in its periphery which mesh with a gear 222 free on a shaft 223 journaled in the machine framework. Integral with the gear 222 is a similar gear 224, which meshes with teeth in the periphery of a segmental transmission gear 225 having internal teeth, the ends of which bear on the periphery of a corresponding disc 226 supported on a shaft 127 in turn supported by the machine framework. The internal teeth of the segment 225 mesh with and drive a pinion 227 fast on a square shaft 228 supported by the discs 226, there being a similar disc for all the transmission segments 225.

Initial movement clockwise of the leading rod 220 permits the primary differential member 221 to move in unison therewith, under influence of the spring 219, until the projection 217 strikes the end of the depressed key 22 to 26. This interrupts clockwise movement of the primary differential member and positions it in accordance with the depressed transaction key. The leading rod 220 completes its initial movement without interruption and during this movement engages the forward end of a concentric slot in the secondary differential member 221 and restores said secondary member, and connected mechanism, to normal, or zero, position.

After the leading rod 220 has completed its initial clockwise movement, it dwells in its extremely moved position until a transaction clutch pinion 229 (FIG. 8) is rocked into engagement with similar teeth in the peripheries of the primary and secondary differential members to clutch said members together for unitary movement. After the differential members have been clutched together, return movement counter-clockwise is imparted to the leading rod 220, causing it to engage the rear, or right-hand, end of the slot in the primary differential member and restore said member from preset position to home, or zero, position, during which restoration the primary member carries the secondary member a corresponding extent in unison therewith to position said member and, through the train of gearing shown in FIG. 8, to also position the segment 225 in accordance with the positioning of the primary differential member. The above-described differential positioning of the transmission segment 225 is transmitted by the pinion 227 and the shaft 228 to corresponding transmission segments (not shown), which are in turn connected to and position corresponding type wheels and indicators (not shown) in accordance with the positioning of said segment 225 under influence of the depressed transaction key.

The clutch pinion 229 (FIG. 8) remains in engagement with the primary and secondary differential members 218 and 221 at the end of machine operation and is disengaged therefrom at the beginning of the succeeding machine operation, and prior to initial movement of the leading rod 220, so that said primary member 218 is free to be positioned by the depressed transaction key, and said secondary member 221 is free to be returned to zero position prior to being positioned by the primary differential member.

Figure 9:
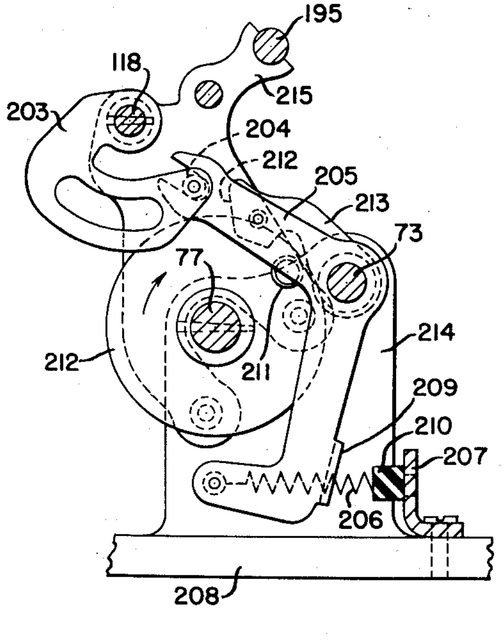
FIG. 9 is a detail view of a portion of the mechanism for initiating operation of the machine.

If a more complete description is required of the mechanism disclosed in FIGS. 8 and 9, reference may be had to similar FIGS. 12 and 15 in the co-pending application Serial No. 341,633 and the description in connection therewith.

The positioning of the segment 225 (FIG. 8) under influence of the depressed clerk's key 22 or 26 is transmitted by the pinion 227 and the shaft 228 to a similar pinion 227 (FIG. 1) which meshes with the internal teeth of a gear sector 126, the internal teeth of which bear on the periphery of one of the discs 226 supported by the shaft 127, to position said sector 126 in accordance with the positioning of the segment 225 under influence of the depressed Row 1 control key 22 to 26.

The sector 126 has a cam slot 128 which is engaged by a roller 129 mounted on a rearward arm of a lever 130 free on a stud 131 secured in a left machine frame 132. A downward arm of the lever 130 has pivotally connected thereto, one end of a link 133, the other end of which is pivotally connected to an upward arm of a lever 134 free on a stud 135, secured in the frame 132. A short link 136 pivotally connects the lever 134 to a beam 137 pivoted on a stud 138 carried by a switch operating arm 139 pivoted on a stud 140 secured in the frame 132. The beam 137 is pivotally connected by a link 141 to an arm 142 secured on the machine release and key lock shaft 118.

Free on the shaft 118 is a switch operating plate 144 flexibly connected by a spring 143 to the arm 142, said spring tensioned between a stud in said plate 144 and a stud 145 in said arm 142, to normally maintain said plate 144 in yielding contact with said stud 145. The plate 144 has a cam slot 146 engaged by a stud 147 in the forward end of a lever 148 free on a stud 149 in the frame 132. A rearward extension of the lever 148 has a slot which engages a stud in a motor switch operating slide 150 mounted for vertical shifting movement by means of parallel slots therein in cooperation with studs fixed in the frame 132. The slide 150 is pivotally connected to a bell crank 151 which is pivoted on a pin secured in a stud 152 which extends outwardly from the frame 132. The bell crank 151 is also pivotally connected to a motor switch operating arm 153, which, when the machine is at rest, retains a switch for the machine operating motor in open position so that the circuit to said motor will be broken.

Release of the machine for operation, by depression of any of the control keys in Row 1 or Row 2 (FIGS. 2, 8 and 9) frees the release shaft 118 (FIG. 1), to spring tension which immediately rocks said shaft, the arm 142 and the plate 144 counterclockwise, as viewed in FIG. 1, and clockwise, as viewed in FIGS. 8 and 9. Counterclockwise movement of the plate 144 (FIG. 1) causes the slot 146 in cooperation with the stud 147 to rock the lever 148 clockwise to lift the slide 150, said slide through the bell crank 151 operating the arm 153 to close the switch for the operating motor to initiate operation of the machine. The shaft 118 is restored clockwise near the end of machine operation, as explained before, and upon being restored operates through the mechanism described above to open the motor switch, to terminate operation of the machine. The flexible connection formed by the spring 143 between the arm 142 and plate 144, permits said plate 144 to yield in case said arm 142 and the shaft 118 are restored too fast and too far near the end of machine operation, thus preventing possible damage to the parts which operate the switch mechanism for the operating motor.

The switch operating arm 139 (FIG. 1) carries an insulating block 154 which coacts with a switch arm 155 pivoted on a stud 156 secured in a plate 157, in turn secured to the left frame 132. A spring 158 urges the switch arm 155 counterclockwise to normally maintain a contact point carried thereby in yielding contact with a companion contact point carried by a block 159 secured to said plate 157. The switch arm 155 is connected to one terminal of any suitable electrical supply source and a continuation of said terminal is connected between the block 159 and a base or socket 160 of a clear signal lamp 163, said base being mounted on a bracket 161 secured to an indicator frame 162, in turn secured to the left frame 132. The mechanism of the machine is enclosed by a suitable case or cabinet 164, having a window (not shown) opposite the lamp 163, said window having a translucent cover of plastic material through which the light of the lamp 163 shines. A reflector 165 secured to the bracket 161 and located directly behind the lamp 163 and the opening in the cabinet 164 directs the rays of light through said translucent opening. A switch 166 mounted on a bracket 167 (FIG. 1) secured to the frame 132, is interposed in the circuit between the switch arm 155 and the source of current supply and may be used to render the clear signal lamp 163 operative or inoperative whenever required. The circuit to the lamp 163 is completed by a suitable terminal (not shown) extending from the base of said lamp directly to the source of electrical supply.

The clear signal light 163 burns to indicate that the main itemizer has been selected for a clearing or item total operation, and is controlled by the A and B keys 22 and 26 (FIG. 2) through the differential mechanism associated therewith, which, as previously explained in connection with FIG. 8, positions the sector 126 according to the depressed key 22 or 26. When either the A or B control key 22 or 26 is depressed, to initiate an item total operation, the positioning of the sector 126 under control thereof, causes the cam slot 128 in cooperation with the roller 129 to position the lever 130 and connected parts, including the switch operating arm 139 as shown here (FIG. 1) whereupon said switch operating arm 139 permits the switch arm 155 to be held in closed condition by its spring 158, to complete the circuit to the light 163, so that said light will burn when the machine is at rest. Counterclockwise movement of the shaft 118 and arm 142 (FIG. 1) upon release of the machine for operation, through the link 141, rocks the beam 137 clockwise or downwardly, the stud 168 in the link 136 forming a pivot for said beam. Clockwise movement of the beam 137 rocks the switch operating arm 139 counterclockwise causing the block 154 to engage and rock the switch arm 155 clockwise against the action of the spring 158, to separate the contact point thereon from the contact point on the block 159, to break the circuit to the light 163, to cause said light not to burn while the machine is operating.

Positioning of the sector 126 (FIGS. 1 and 2), under control of the Sub-Total key 23, the Grocery key 24 or the Taxable Total key 25, causes the slot 128 in cooperation with the roller 129, to rock the lever 130 clockwise from the position here shown. Clockwise movement of the lever 130, through the link 133, rocks the lever 134 counterclockwise, which through the link 136 rocks the beam 137 also counterclockwise, the stud 169 forming a pivot for said beam 137. Counterclockwise movement of the beam 137 rocks the switch operating arm 139 also counterclockwise, causing said arm to open the switch arm 155 to break the circuit to the light 163, so that said light will not burn when other than the A and B keys 22 and 26 of Row 1 are used to initiate machine operation.

It will be noted by referring to FIG. 8 that Row 1 control keys 22 to 26 inclusive are not provided with a zero stop lever, and in this case, when a key in Row 2 is used to initiate machine operation and no key is depressed in Row 1, the primary differential member 218 is free to move full distance clockwise, upon initial movement of the rod 220, and upon return movement positions the secondary differential member 221 accordingly. The secondary member in turn positions the segment 225 and the sector 126 (FIG. 1) so that the extreme upper end of the slot 128 is opposite the roller 129, and this in turn imparts clockwise movement to the lever 130, exactly the same as when one of the Row 1 transaction keys 23, 24, or 25 is depressed. In this case, the switch 155 will be opened to break the circuit to the light 163, and consequently the light will not burn when a machine operation is performed under control of the Row 2 keys.

From the foregoing description it should be clear that all item transactions are concluded by an item total operation in which the main item totalizer on the No. 1 totalizer line is cleared, by use of either the A control key 22 or the B control key 26, and that either of these keys through their differential mechanism, shown in FIG. 8, controls the positioning of the sector 126 (FIG. 1) to cause the switch 155 to be rendered effective to light the light 163 to indicate that a clearing operation has been performed in the main item totalizer. If it is desired not to use the clear signal feature, the switch 166 may be used to prevent lighting of the light 163. It should be remembered that the light 163 burns only when the machine is at rest and operation of the key lock and release shaft 118 to initiate machine operation causes the switch arm 139 (FIG. 1) to open the switch 155 to break the circuit to the light 163 so that it will not burn during machine operation.

*Drawer mechanism*

Certain machines of this type have a cash drawer for each of the A and B keys 22 and 26, however, in the present adaptation there is only one drawer provided for both of these keys, this being a matter of choice which may be determined by the purchaser of the machine.

The single cash drawer, (not shown) of conventional construction, is opened automatically near the end of item total operations under the control of the A and B keys 22 and 26. The lever 130 (FIG. 1) carries a stud 171 which engages a slot in the upper end of a link 172 the lower end of which link is pivoted on a stud carried by a pitman 173 pivotally connected at its rearward end to an upward extension of a lever 174, in turn pivoted on a stud 175 secured in the left frame 132. A link 176 pivotally connects the lever 174 with a drawer latch operating lever 177, which is operatively connected to the drawer latch mechanism, which normally holds the drawer in closed condition against the action of a spring which is activated to push said drawer from its closed to its opened position in the usual manner.

The drawer and drawer latch mechanism of the present machine is not shown herein but is similar in every way to that shown in FIGS. 2, 27, 28 and 29 of application Serial No. 341,633, now United States Patent No. 2,880,930.

A spring 178 urges the pitman 173 and link 172 downwardly to normally maintain a narrow upper portion of an opening 179 in an enlarged forward end of said pitman 173 in engagement with a roller 180 carried by a lever 181 free on the shaft 73. The lever 181 carries rollers 182 and 183 which coact respectively with the peripheries of companion plate cams 184 and 185 secured on the main cam shaft 77.

Whenever an item total operation is performed under control of either of the A or B keys 22 or 26 (FIGS. 1 and 2) the slot 128 in the sector 126, in cooperation with the roller 129, positions the lever 130 as here shown, which through the link 172 positions the pitman 173 in its downward position, to engage the narrow upper branch of the opening 179 with the roller 180, as shown here. One counterclockwise revolution of the cam shaft 77 and the cams 184 and 185 (FIG. 1) each machine operation, rocks the lever 181 counterclockwise, near the end of machine operation, to shift the pitman 173 forwardly to rock the lever 174 clockwise, causing the link 176 to raise the lever 177 to release the latch for the drawer, whereupon said drawer is spring pushed to open position. Immediately after the drawer has opened and just before the end of machine operation, the cams 184 and 185 restore the lever 181 and connected parts to normal position as here shown.

Using keys in Row 1, other than the A and B keys 22 and 26, to initiate machine operation, positions the sector 126 so that the slot 128 therein coacting with the roller 129 rocks the lever 130 clockwise a slight distance from the position shown here, (FIG. 1). This clockwise movement of the lever 130, which as previously explained opens the switch 155, lifts the link 172 to rock the pitman 173 counterclockwise, against the action of the spring 178, to move the narrow portion of the opening 179 out of coacting relationship with the roller 180 and to move an enlarged portion at the downward end of said opening 179 into coacting relationship with said roller. Operation of the lever 181 by the cams 184 and 185, causes the roller 180 to move idly back and forth in the enlarged lower portion of the opening 179 without imparting releasing movement to the drawer latch mechanism and consequently the drawer remains in a closed condition when other than the A and B keys 22 and 26 are used to initiate machine operation. In cases where a key in Row 2 is used to initiate machine operation, the sector 126 (FIG. 1) is positioned, as explained before, so that the extreme upper end of the slot 128 engages the roller 129, and this in turn imparts clockwise movement to the lever 130, to lift the link 172 and the pitman 173 to aline the enlarged bottom portion of the opening 179 with the roller 180 to disable the drawer-opening mechanism in the manner explained previously.

*Statement of operation*

Inasmuch as the mechanism of the present invention is not of a complex nature, it is believed that an understanding of the operation of the machine will have been obtained from a perusal of the preceding description. However, a brief description of operation will be given using FIG. 2 as a basis.

As is the case in previous machines of this type, an itemizing transaction consists of one or more item entering operations in which the items are accumulated in either the main item totalizer of the auxiliary item totalizer and simultaneously distributed to their various corresponding group totalizers, and a final item total operation.

In the item entering operations of an itemizing transaction the amount of the first item is set up on the amount keys 20, and in the case of non-taxable items, the proper one of the item keys 24, 27, 28 or 30 is depressed to initiate an item entering operation during which the amount of the item is entered additively in the main item totalizer and in the corresponding group totalizer on the No. 2 line, and at the same time said item is set up on the indicators and printed upon the record material, which, in most cases consists of a detail strip which is left in the machine for a predetermined period of time and an issuing receipt. Subsequent items are entered in the same manner. If a taxable item is to be entered, the Taxable Item key 29 is used to initiate the item entering operation during which the amount of the taxable item is entered in the auxiliary or taxable item totalizer, and simultaneously set up on the indicators and printed upon the record material.

After all the taxable and non-taxable items have been entered in the manner explained above, the Taxable Total key 25 is depressed to initiate a taxable total operation, during which the total amount of the taxable items accumulated in the auxiliary itemizer is cleared from said itemizer and simultaneously transferred to the main itemizer and set up on the indicators and printed upon the record material. After the taxable total operation has been performed, a final item total operation is initiated by depression of the A or B key 22 or 26, and during this operation the total amount of the accumulated items is cleared from the main itemizer, transferred to the corresponding group totalizer on the No. 1 line and to the common group totalizer for the A and B keys on the No. 2 line, and at the same time said item total is set up on the indicators and printed upon the record material. Using the A or B keys 22 or 26, (FIGS. 1 and 2) to initiate an item total operation, through their differential mechanism, positions the sector 126, causing the slot 128 therein, in cooperation with the roller 129, to position the lever 130 and connected parts as shown here to render the switch 155 effective to light the clear signal light 163 to indicate that the item totalizer has been selected for a clearing operation, and therefore should be in a cleared condition and that the item transaction has been completed.

As previously explained, all item transactions are performed with the total control slide 32 (FIG. 2) in Register position, as here shown. At any time during an item transaction the item Sub-Total key 23 may be used to obtain a reading or sub-total of the amount in the main item totalizer.

To read or reset the totalizers on the No. 2 line corresponding to the control keys 24, 27, 28 and 30, the total control slide 32 (FIG. 2) is moved to either Read Row 2 or Reset Row 2 position, after which the keys referred to above may be used to read or reset their corresponding totalizers on said No. 2 line.

The totalizer on the No. 2 line corresponding to the Tax Group key 31, as previously explained, accumulates a grand total of the amounts cleared from the main item totalizer under control of both the A key 22 and the B key 26. In the present arrangement no provision is made for clearing the amount from the tax-group totalizer, consequently it is possible only to read the amount in said totalizer and this may be accomplished by moving the total control slide 32 to Read Row 2 position and then using the key 31 to select the No. 2 tax-group totalizer for a reading operation. Amounts cleared from the main item totalizer, under control of the A and B keys 22 and 26, are also accumulated in corresponding group totalizers on the No. 1 line and these totalizers may be read or reset by moving the total control slide 32 to either Read Row 1 or Reset Row 1 position and using the proper key 22 or 26 to select the corresponding group totalizer for a reading or resetting operation.

While the form of mechanism herein shown and described is admirably adapted to fulfill the objects primarily stated, it is to be understood that it is not intended to confine or limit the invention to the one form or embodiment herein disclosed for it is susceptible of embodiment in various other forms without departing from the spirit and scope of this invention.

What is claimed is:

1. In a machine of the class described, capable of performing item-entering and item-total operations, and having a totalizer in which the items are accumulated, the combination of manually-operable means to select the totalizer for an item-total operation to clear or zeroize said totalizer; means operable by the manually-operable means to initiate operation of the machine; a light to signal operation of the manually-operable means; a switch for the light; an arm to operate the switch; a beam to operate the arm; means positioned by the manually-operable means and coacting with the beam to operate the arm and the switch to cause the light to light; and connections between the beam and the initiating means whereby operation of said initiating means to initiate machine operation causes the beam to operate the arm and the switch to prevent lighting of the light under control of the manually-operable means until near the end of machine operation to indicate that a zeroizing operation has been performed in the totalizer.

2. In a machine of the class described, capable of item transactions, and having a totalizer in which the different items of a transaction are accumulated, the combination of manually-operable means to select the totalizer for a clearing or zeroizing operation to obtain a total of the items accumulated therein; a light to signal the operation of the manually-operable means to indicate that a zeroizing operation is being performed in the totalizer; a switch for the light; an arm to operate the switch; a beam connected to the arm; a cam member positionable under control of the manually-operable means; means connected to the beam and coacting with the cam member to alternately open and close the switch as said cam member is being positioned to normally cause the light to alternately light and go out in the interval of machine operation that said cam member is being positioned; and means coacting with the beam during machine operation to supersede the control of the switch by the cam member to hold said switch open during the interval that said cam member is being positioned, to prevent unnecessary lighting of the light during machine operation, said coacting means effective near the end of machine operation to return control of the switch to the cam member.

3. In a machine of the class described, constructed and arranged to perform item-entering and item-total operations, and having a totalizer to accumulate the items as they are entered, the combination of means including a spring-operated release shaft to initiate machine operation; manually-operable means to free the release shaft for releasing movement and to simultaneously select the totalizer for an item-total operation to cause said totalizer to be zeroized; a light to signal operation of the manually-operable means; a switch for connecting the light to a suitable source of electrical energy; an arm to operate the switch; a beam mounted on the arm; a lever operatively connected to the beam; means including a cam member coacting with the lever and positionable under control of the manually-operable means to operate the beam and the arm to close the switch to normally cause the light to light to signal the operation of said manually-operable means; connections between the beam and the release shaft effective upon releasing movement of said shaft to operate said beam and the arm to open the switch, regardless of its operation by the cam member, and to hold said switch open until near the end of machine operation to prevent unnecessary burning of the lamp during machine operation; and means to restore the release shaft to unoperated condition near the end of machine operation to return control of the switch to the cam member to cause the light to light near the end of machine operation to signal operation of the manually-operable means to select the totalizer for a zeroizing operation.

4. In a machine of the class described, constructed and arranged to perform item-entering and item-total operations, and having a totalizer to accumulate the items as they are entered, the combination of means including a spring-operated release shaft to initiate machine operation; manually-operable means to free the shaft for releasing movement and to simultaneously select the totalizer for an item-total operation to cause said totalizer to be zeroized; a light to signal the operation of the manually-operable means to select the totalizer for a zeroizing operation; a switch for connecting the light to a suitable source of electrical energy; an arm to operate the switch; a beam mounted on the arm; a lever operatively connected to the beam; a cam member having high and low cam portions coacting with the lever, said cam member positionable under control of the manually-operable means during machine operation to cause a high cam portion to coact with the lever to cause the beam and the arm to close the switch to normally cause the light to light; connections between the beam and the release shaft effective upon releasing movement of said shaft to operate said beam and the arm to open the switch and retain it open during machine operation regardless of the control of said switch by the manually-operable means, to prevent unnecessary burning of the light during machine operation; and means to restore the shaft to unoperated condition near the end of machine operation to again operate the beam and the arm to close the switch, to in turn light the light to signal the operation of the manually-operable means to select the totalizer for a zeroizing operation.

References Cited in the file of this patent

UNITED STATES PATENTS

| | | |
|---|---|---|
| 1,485,341 | Waldheim | Feb. 26, 1924 |
| 1,817,451 | Gubelmann | Aug. 4, 1931 |
| 1,873,760 | Green | Aug. 23, 1932 |
| 1,947,512 | Barrett | Feb. 20, 1934 |
| 2,552,789 | Hopkins | May 15, 1951 |
| 2,698,139 | Goodbar et al. | Dec. 28, 1954 |

FOREIGN PATENTS

| | | |
|---|---|---|
| 1,053,270 | France | Sept. 30, 1953 |